US006871123B2

(12) United States Patent
Shimel

(10) Patent No.: US 6,871,123 B2
(45) Date of Patent: Mar. 22, 2005

(54) SYSTEM AND METHOD ALLOWING FOR AN INTEGRATED FLIGHT LOADS BALANCING PROCESS

(75) Inventor: Bruce Shimel, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 17 days.

(21) Appl. No.: 10/761,102

(22) Filed: Jan. 20, 2004

(65) Prior Publication Data

US 2004/0153219 A1 Aug. 5, 2004

Related U.S. Application Data

(62) Division of application No. 10/180,446, filed on Jun. 26, 2002, now Pat. No. 6,754,566.

(51) Int. Cl.[7] .............................. G06F 7/00; B64C 11/34
(52) U.S. Cl. ................................. 701/3; 701/7; 701/10; 244/1 R; 244/75 R
(58) Field of Search ............................. 701/3, 7, 10, 14, 701/1; 244/1 R, 75 R

(56) References Cited

U.S. PATENT DOCUMENTS

| 4,562,980 A | 1/1986 | Deans et al. |
| 4,646,241 A | 2/1987 | Ratchford et al. |
| 4,749,156 A | 6/1988 | Davenport et al. |

*Primary Examiner*—William A. Cuchlinski, Jr.
*Assistant Examiner*—Olga Hernandez
(74) *Attorney, Agent, or Firm*—Harness Dickey & Pierce P.L.C.

(57) ABSTRACT

A system allowing for an integrated flight loads balancing process at one or more time instances of a flight maneuver of an aircraft includes a processor and a plurality of resources. Additionally, the system includes a resource integration program that is executable by the processor. Upon execution by the processor, the resource integration program operates to integrate the plurality of resources so that the integrated resources are accessible to the system while balancing the flight loads at the one or more time instances.

42 Claims, 10 Drawing Sheets

SYSTEM AND METHOD ALLOWING FOR AN INTEGRATED FLIGHT LOADS BALANCING PROCESS

CROSS-REFERENCE TO RELATED APPLICATION

This application is a divisional of U.S. patent application Ser. No. 10/180,446 filed on Jun. 26, 2002, now U.S. Pat. No. 6,754,566 which issued on Jun. 22, 2004. The disclosure of which is incorporated herein by reference in its entirety as if fully set forth herein.

COPYRIGHT NOTICE

A portion of the disclosure of this document contains material that is subject to copyright protection. The copyright owner has no objection to the facsimile reproduction by anyone of the patent disclosure, as it appears in the U.S. Patent and Trademark Office patent files or records, but otherwise the copyright owner reserves all copyright rights whatsoever.

FIELD OF THE INVENTION

The present invention relates generally to aircraft design loads, and more particularly to the balancing of flight loads on an aircraft during a flight maneuver.

BACKGROUND OF THE INVENTION

Design loads are an important part of the aircraft design process. For example, the structural design of the aircraft is based at least in part on flight loads. The flight loads are typically derived through a combination of the aerodynamic loads, aircraft inertia, structural flexibility, and engine loads.

The structural design stage of the aircraft design process can be incredibly complex. Indeed, the complexity of the structural design stage for many modern aircraft is continually increasing as the design criteria for modern aircraft grow in complexity. For example, the number of design variables and constraints for a typical flight loads balancing process performed on a high-performance aircraft, such as the Boeing® Company's X-45 combat drone or Unmanned Combat Air vehicle (UCAV), may include thousands of balanced conditions in design loads development and fatigue load assessments.

Notwithstanding the aforementioned complexity, the structural design of an aircraft is highly dependent on the timeliness and accuracy of design flight loads. Design flight loads are used for determining whether an aircraft structure will be able to endure the demands placed on it during flight. The aircraft must not only be capable of enduring the forces, pressures and stresses while the aircraft is flying level at a constant speed, but the aircraft must also be able to withstand the additional forces, pressures and stresses that arise while the aircraft is being maneuvered. The additional forces, pressures and stresses placed on the aircraft during a maneuver can be considerable especially when the aircraft is executing high-speed maneuvers such as a climbs, dives, banking turns, rolls, etc.

To determine the forces, pressures and stresses an aircraft is experiencing during a maneuver, a flight loads balancing process may be performed by a loads engineer. With known processes, however, the loads engineer must access various fragmented resources (e.g., stand-alone programs or applications, databases, files, etc.) in a piecemeal fashion to balance flight loads.

Moreover, known balancing processes only allow for a single flight maneuver time instance to be processed at a time. Thus, a time-consuming and cumbersome iterative process must be performed to balance the flight loads at a plurality of time instances.

Known balancing processes also require considerable user intervention (e.g., data entry, time instance designation, etc.) for each and every time instance immediately before the flight loads are balanced at that time instance. Such labor intensive processes lead to even further expenditures of valuable resources and time.

In addition, it is often necessary for the loads engineer to balance the flight loads at numerous critical load points of the flight maneuver. For example, loads and strength analysis groups usually require balanced flight loads at the time instances whereat the absolute maximum and minimum load points of the maneuver occur. Unlike the loads and strength analysis groups, however, the fatigue analysis group is typically interested in all of the peak and valley points of the maneuver. Ideally, several hundred or even a few thousand balanced load cases are required for fatigue analysis. With known processes, balancing the flight loads at such a great number of time instances can be especially taxing upon the loads engineers and require considerable expenditures of time and resources.

SUMMARY OF THE INVENTION

Accordingly, a need remains in the art for a device and method that allows for an integrated process of balancing flight loads at more than a single flight maneuver time instance with little to no user intervention being required between the various time instances at which the flight loads are to be balanced. Ideally, the device and method would have the flexibility to be tailored to any candidate aircraft.

Generally, embodiments of the present invention integrate, e.g., "wraps", code around various existing resources (e.g., hardware resources, software resources, data resources, etc.) that are otherwise fragmentally usable (i.e., in a piecemeal fashion) to balance the aircraft flight loads at a single flight maneuver time instance. Accordingly, embodiments of the present invention streamline and simplify the flight loads balancing process by allowing an integrated flight loads balancing process to be performed at a plurality of flight maneuver time instances with little to no user intervention being required between the various time instances at which the flight loads are to be balanced.

In one form, the present invention provides a system that allows for an integrated flight loads balancing process to be performed on an aircraft at one or more available flight maneuver time instances. The system comprises a processor and a plurality of resources that are accessible to the processor. The resources are otherwise usable to perform a fragmented flight loads balancing process on the aircraft at a single flight maneuver time instance. Additionally, the system includes a resource integration program or software package that is executable by the processor. Upon execution by the processor, the resource integration program allows for integration of the plurality of resources. Accordingly, the system may access the resources and balance the flight loads at a plurality of available flight maneuver time instances with little to no user intervention being required between the time instances at which the flight loads are to be balanced.

Preferably, the execution of the resource integration program by the processor generates or implements an interface. In one form, the interface comprises a plurality of interactive screens (e.g., panels and dialog boxes) that allow a user to readily specify various input parameters and the resources that will be integrated for use by the system to balance the flight loads.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. For example, it is anticipated that the invention will be applicable to any of a wide range of aircraft (e.g., but not limited to, fighter jets, commercial jets, private jets, propeller powered airplanes, among others) regardless of the manner in which the aircraft is piloted (e.g., directly, remotely, via automation, or in a combination thereof, among others). Accordingly, the specific references to aircraft herein should not be construed as limiting the scope of the present invention. In addition, the terms "maneuver" and "flight maneuver" as used herein shall be construed by those skilled in the art to not only include intended and controlled variations from a straight and level flight path in the operation of the aircraft (e.g., climbs, dives, rolls, banking turns, among others) but should also include level flight wherein the aircraft is accelerating, decelerating, or maintaining a constant speed.

Figure 1:
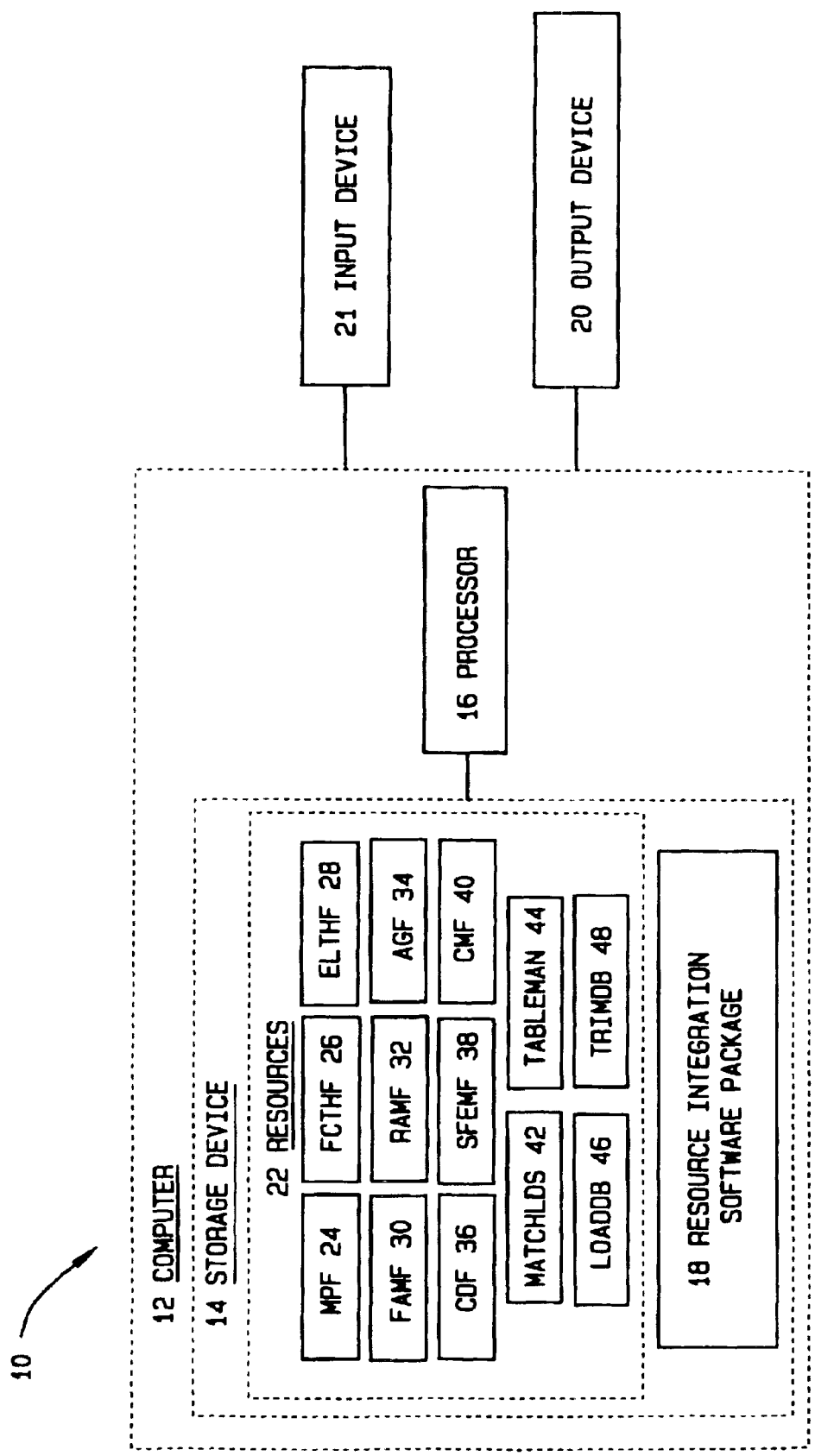
FIG. 1 is a schematic of a system allowing for an integrated flight loads balancing process in accordance with the principles of a preferred embodiment of the present invention.

FIG. 1 is a schematic of a control system 10 in accordance with a preferred embodiment of the present invention. The system 10 enables an integrated flight loads balancing process to be performed for a plurality of flight maneuver time instances. As shown, the system 10 includes a computer 12, which may comprise any of a wide range of computers now known in the art or that may be developed in the future. By way of example only, the computer 12 may comprise a desktop or laptop personal computer having a Microsoft® Windows® 2000 operating system and 512 megabytes of Random Access Memory (RAM). Alternatively, the computer 12 can be any suitable computer capable of storing data and executing software programs.

The computer 12 preferably includes a storage device 14 and a processor 16 suitable for executing the functions of the computer 12. The processing unit or processor 16 may comprise any of a wide range of suitable processors as would be obvious to persons having ordinary skill in the art after having become familiar with the teachings of the present invention. For example, the processing unit 16 may comprise an Intel® Pentium® processor such as the 933 MHz Intel® Pentium® III processor.

The storage device 14 may comprise computer readable media for storing such items as program code, software packages, programs, algorithms, information, data, files, databases, applications, among other things. For example, the storage device 14 may comprise one or more computer readable storage media on which is stored the resource integration program or software package 18. Indeed, the storage device 14 can be any suitable computer readable storage device, such as read only memory (ROM), random access memory (RAM), video memory (VRAM), hard disk, floppy diskette, compact disc (CD), magnetic tape, a combination thereof, etc.

In the illustrated embodiment, the system 10 includes a single processor 16 and a single storage device 14. However, it is to be understood there can be any number of (i.e., one or more) processors 16 and/or any number of storage devices 14 that are connected or linked via a local area network (LAN), a wide area network (WAN), a secure network, an Intranet, the Internet, etc. In such a scenario, the storage of computer readable program code may be distributed over the various storage devices 14 and/or executed in parts by the various processors 16.

The system 10 further includes an output component 20 (e.g., graphical display, printer, among others) for displaying or outputting such things as information and data whether textually or graphically. The system 10 also includes an input device 21 (e.g., a mouse, keyboard, other computer pointing devices, among others) that allows a user to input information, data, queries, etc. into the computer 12. Accordingly, the output component 20 and the input device 21 allow the user to interact with the system 10. In other embodiments, any number of suitable peripheral devices (e.g., monitor, printer, keyboard, mouse, etc.) may be connected to the system 10 either directly or indirectly.

The system 10 further comprises various resources 22 (e.g., hardware resources, software resources, data resources, etc.) that are otherwise usable in a piecemeal and fragmented fashion to balance flight loads at a single flight maneuver time instance. As described in detail below, the resources 22 which may be used by the system 10 when performing an integrated flight loads balancing process may comprise the following data resources or input files: a Mass Properties File (MPF) 24; a Flight Conditions Time History File (FCTHF) 26; an Engine Loads Time History File (ELTHF) 28; a Flexible Aero Model File (FAMF) 30; a Rigid Aero Model File (RAMF) 32; an Aero Geometry File (AGF) 34; a Component Definition File (CDF) 36; a Structural FEM File (SFEMF) 38; and a Cross Map File (CMF) 40. In addition, the resources 22 may further include the following software resources whose functions are described in greater detail below: MatchLds 42, Tableman 44, LoadDB 46, and TrimDB 48.

As shown, each of the resources 22 may be included in the storage device 14, although such is not required. In other embodiments, one or more of the resources 22 may be separate from storage device 14. For example, one or more of the resources 22 may be separate from and connected to the system 10 via a network.

The system 10 further includes the resource integration program or software package 18 that is executable by the processor 16 using inputs from the input device 21. The resource integration program 18 may be embodied in computer readable program code stored in one or more computer readable storage media operatively associated with the system 10. For example, the computer readable program code comprising the resource integration program 18 may be stored in one or more computer readable storage media residing at, or associated with, the storage device 14. Alternatively, the resource integration program 18 may be stored elsewhere, such as a network device or a network site of a network to which the system 10 is connected. Regardless of where it resides, however, the resource integration program 18 may comprise program code for integrating the various resources 22.

It is to be understood that the computer readable program code described herein can be conventionally programmed using any of a wide range of suitable computer readable programming languages that are now known in the art or that may be developed in the future. Preferably, however, the computer readable programming language comprising the resource integration program 18 is a cross-platform compatible computer language, such as Java.

It is also to be understood that the computer readable program code described herein can include one or more functions, routines, subfunctions, and subroutines, and need not be combined in a single package but may instead be embodied in separate components. In addition, the computer readable program code may be a stand-alone application, or may be a plug-in module for an existing application and/or operating system. Alternatively, the computer readable program code may be integrated into an application or operating system. In yet another embodiment, the computer readable program code may reside at one or more network devices (not shown), such as an administrator terminal, a server, etc.

In the preferred embodiment, the execution of the software package 18 by the processor 16 provides the user with a series of interactive screens (e.g., panels and dialog boxes shown in FIGS. 3 through 17) that are graphically displayed via the output component 20 (FIG. 1). As described in greater detail below, the interactive screens allow at least one user input for the integrated flight loads balancing process. For example, the interactive screens may allow the user to specify the paths or file names for the particular resources 22 that will be integrated and used by the system 10 when balancing the flight loads.

Preferably, the system 10 filters or analyzes the files before making them available to the user via a corresponding one of the interactive screens. For example, the Time History Panel 150 described in greater detail below preferably displays only time history files to the user. The user may nevertheless have the option to display all files.

Although the present invention is described with the resource integration program 18 having a direct effect on and direct control of the system 10, it should be understood that it is the instructions generated by the execution of the resource integration program 18 by the processor 16, and the subsequent implementation of such instructions by the processor 16, that have direct effect on and direct control of the system 10.

Figure 2:
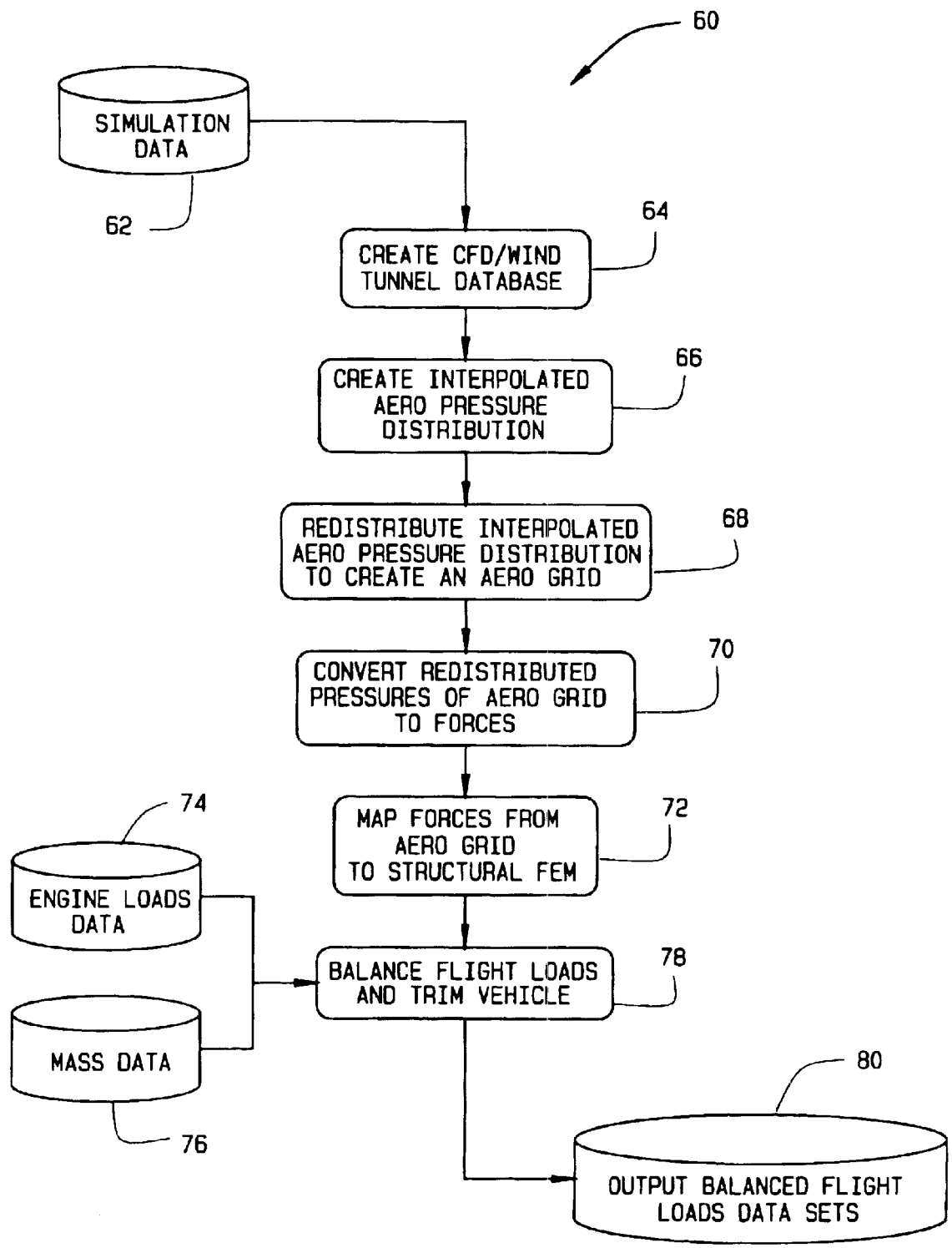
FIG. 2 is a flow diagram of a method that may be used by the system shown in FIG. 1 when balancing flight loads.

During one operational sequence, the system 10 may be operated in accordance with a method 60 shown in FIG. 2 to balance flight loads at one or more flight maneuver time instances. As shown in FIG. 2, the method 60 comprises accessing simulation data at step 62. The simulation data may include the simulated flight conditions as calculated by a six degrees of freedom simulation and the resulting component loads or wind tunnel flight conditions at which a model of the aircraft was tested in a wind tunnel and the resulting component loads on the aircraft model during the wind tunnel test. Typically, the component loads will include the localized (i.e., undistributed) forces or loads at a plurality of nodes on the aircraft model. For example, the aircraft model may include any number of nodes or test locations (e.g., wing root, aileron, fore fuselage portion, aft fuselage portion, etc.) at which force measurements are recorded during the wind tunnel simulation.

In the next step 64 of method 60, the simulation data may be used along with computational fluid dynamics (CFD) data and wind tunnel pressure tap data to create a CFD/wind tunnel or rigid aerodynamic loads database (e.g., Rigid Aero Model File 32).

At step 66, an interpolated aero pressure distribution may be created that is based on the CFD/wind tunnel data and the actual flight conditions for the particular flight maneuver time instance. The CFD/wind tunnel data and the actual flight conditions may be contained in the Rigid Aero Model File (RAMF) 32 and Flight Conditions Time History File (FCTHF) 26, respectively. Although it is not shown, the interpolated aero pressure distribution may also be based at least in part on a flexible aerodynamic loads database (e.g., Flexible Aero Model File (FAMF) 30) comprising the incremental loads due to static deformation of the aircraft's wings. In addition, the Tableman application 44 (FIG. 1) may be used at least in part by the system 10 at step 66 when creating the interpolated aero pressure distribution.

As described earlier, the simulation data 62 includes component loads occurring at specific locations or nodes on the aircraft model while the aircraft model is undergoing a wind tunnel test at certain flight conditions or as calculated by the simulation. By using interpolation to create the interpolated aero pressure distribution at step 66, the pressures at other than the node locations and/or the pressures at various other flight conditions may be obtained without having to provide additional nodes on the model and without having to perform additional wind tunnel simulations.

The next step 68 comprises redistributing the interpolated aero pressure distribution to create an aero grid. The aero grid may be created by matching the component loads at the selected flight conditions with the interpolated aero pressure distribution. Stated simply, the interpolated aero pressure distributed is corrected or redistributed to more accurately reflect the wind tunnel "truth" (i.e., physically measured) data. More specifically, the component loads, being true as they were physically measured in the wind tunnel, are compared with the interpolated aero pressure distribution. Based on the comparison, the magnitude of the interpolated aero pressure distribution is then increased or decreased by a component load to redistributed load ratio conversion factor. In short, step 68 may comprise adjusting the magnitude of the interpolated aero pressure distribution to more accurately reflect the wind tunnel data while keeping constant the shape of the interpolated aero distribution. The MatchLds application 42 (FIG. 1) may be used at least in part by the system 10 at step 68 when creating the aero grid.

At step 70, the redistributed pressures of the aero grid may be converted to forces. In the next step 72, the converted forces may then be mapped from the aero grid created at step 68 to a structural finite element model (FEM) of the aircraft (e.g., the Structural FEM File (SFEMF) 38). The LoadDB application 46 may be used at least in part by the system 10 when converting the redistributed pressures to forces at step 70 and/or when mapping the forces to the structural FEM at step 72. In an alternative embodiment, steps 70 and 72 may be interchanged such that the redistributed pressures are first mapped to the structural FEM before they are converted to forces.

The method 60 may also include accessing or retrieving engine loads data at step 74 and mass data at step 76. The engine loads data may be contained in the Engine Loads Time History File (ELTHF) 28. The engine loads data may include the engine loads or forces on the structural FEM of the aircraft for the available flight maneuver time instances. Accordingly, the user may be required to designate the particular time instances for which the flight loads balancing process will be performed.

The mass data may be included in the Mass Properties File (MPF) 24. The mass data may include the mass properties (e.g., concentrated mass, weight, center of gravity, etc.) on the structural FEM.

Although the engine loads data and mass data are shown as being accessed immediately prior to a balancing and trimming step 78, these data may be accessed any time prior to the balancing and trimming step 78. Indeed, the engine loads data and mass data are preferably accessed when the simulation data (step 62) is accessed. It should be noted that the order in which the simulation data, engine loads data, and mass data are accessed may vary.

At step 78 the flight loads on the aircraft are balanced and the aircraft is trimmed. That is, the mapped forces from step 72, the engine loads data from step 74, and the weight data from step 76 are balanced and the aircraft is trimmed, thereby producing a balanced flight loads data set for the particular time instance being analyzed. The TrimDB application 46 may be used at least in part by the system 10 when balancing the flight loads and trimming the aircraft at step 78. Steps 62 through 78 may then be repeated for each of the remaining time instances for which the flight loads are to be balanced.

After a balanced flight loads data set has been obtained for each flight maneuver time instance, the balanced flight loads data sets may be output at step 80. The balanced flight loads data set may include data pertaining to the adjusted rigid body states of the aircraft, the balanced flight loads or pressures, the distributed aerodynamics loads on the structural FEM, the distributed engine loads on the structural FEM, a single force/moment representative of the engine's influence for the entire aircraft, the distributed inertial loads on the structural FEM, a single force/moment representative of the entire aircraft, among others.

The various information comprising the balanced flight loads data set may be output in any one of a wide range of manners as would be obvious to one having ordinary skill in the art after having become familiar with the teachings of the present invention. For example, the balanced flight loads data sets may be textually displayed, stored in a file (e.g., log file, database, bulk data file, time history file, other output file, etc.), graphically displayed (e.g., two-dimensional line graphs, three-dimensional color-coded graphical model of the aircraft), provided on NASTRAN formatted force or comment cards, among others.

The balanced flight loads data sets may eventually be used for further structural analysis. For example, data pertaining to the balanced aero loads and the adjusted rigid body states may be used for fatigue loads analysis. Data pertaining to the distributed engine loads on the structural FEM may be used for maneuver and fatigue loads analysis. Aero loads on the structural FEM and the adjusted inertial loads on the structural FEM may be used for maneuver loads analysis.

The method 60 may also comprise additional steps than what are shown in FIG. 2. For example, the method 60 may comprise the step of allowing the user to designate certain time instances (e.g., critical load points), to enter data or change input parameters (e.g., default values, etc.) for the designated time instances, and have the balance process repeated for the designated time instances.

The method 60 may also comprise the step of displaying a text log of diagnostic output. The text log of diagnostic output may comprise important or critical data from each of the software resources (e.g., MatchLds 42, Tableman 44, LoadDB 46, TrimDB 48) that are integrated and used by the system 10 when balancing the flight loads.

Figure 15:
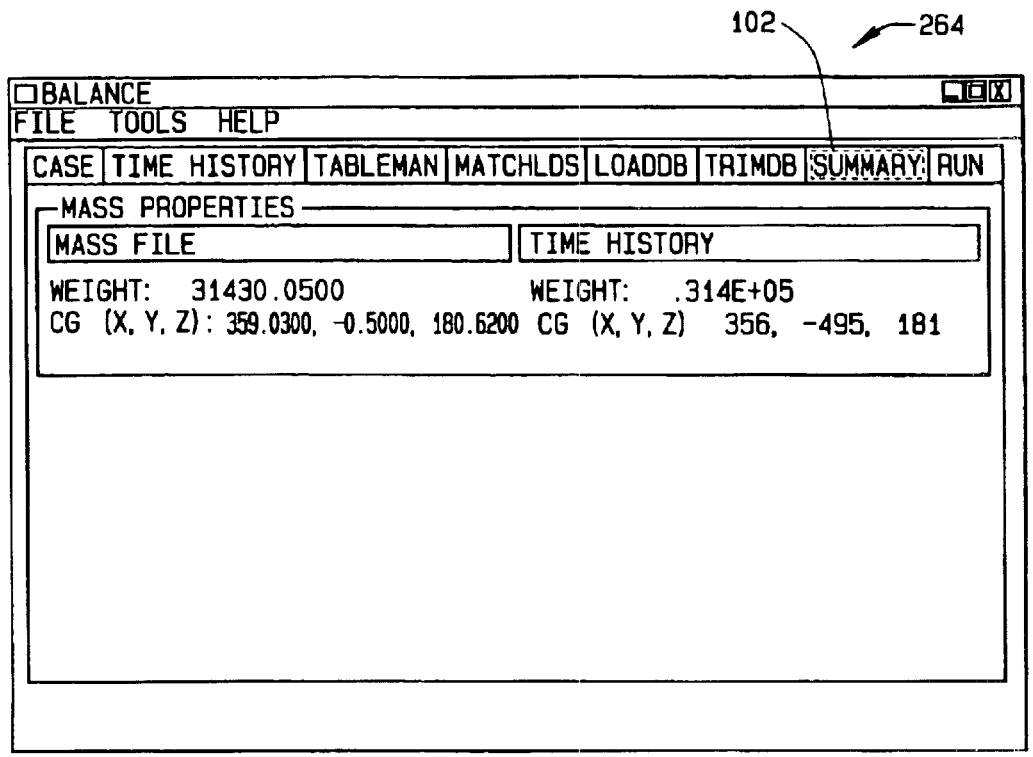
FIG. 15 is an illustration of a Summary panel that may be displayed after the Summary tab has been selected.

In an effort to prevent the waste of computer processing resources and time, the method 60 may also comprise the step of allowing the user to verify for accuracy and consistency the input parameters before steps 62 through 78 are performed for each of the designated time instances. For example, and as shown in FIG. 15 described in greater detail below, a Summary panel 264 may be displayed which allows the user to compare the mass properties (e.g., mass, weight, center of gravity, etc.) from the mass data 76 and the mass properties from the simulation data 62. Alternately, or additionally, the method 60 may comprise the steps of automatically checking the input parameters for consistency, informing the user of inconsistencies, and allowing the user to change the inconsistent input parameters. Preferably, the automatic checks are performed to identify whether additional parameters need to be specified and/or whether any input parameters have been improperly specified. For example, if a required parameter has no specified value, upon execution of the resource integration software module 18, an indication may be provided as to this condition (e.g., user interactively prompted to enter parameter value, error message provided and program halted, etc.).

Another step in the method 60 may comprise graphically displaying one or more of the aircraft models that are used during the integrated flight loads balancing process. For example, the aero grid, the structural FEM, the computational fluid dynamics (CFD) model, and/or the aero geometry may be graphically displayed via the output component 20.

In yet another form, the present invention provides an interface for allowing at least one user input and for providing the at least one user input to the system 10 for use in the integrated flight loads balancing process. Preferably, the interface guides or leads the user to provide certain inputs such as the path and/or file name of the resources to be integrated, the designation of time slices to be processed, designation of the output mode for the balanced flight loads data sets, etc. After being entered, the inputs may then be used by the system 10 during an operational sequence to balance the flight loads on the aircraft at the designated flight maneuver time instances.

Generally, the interface comprises a plurality of interactive screens (e.g., panels and dialog boxes shown in FIGS. 3 through 17) that are displayed on the output component or display 20 of the system 10. The user may interact (e.g., enter or change data within a panel) with the screens by using the input device 20 (e.g., mouse, keyboard, etc.) of the system 10. It should be noted, however, that a user need not necessarily access the interactive screens in the order that the interactive screens are described below.

Figure 3:
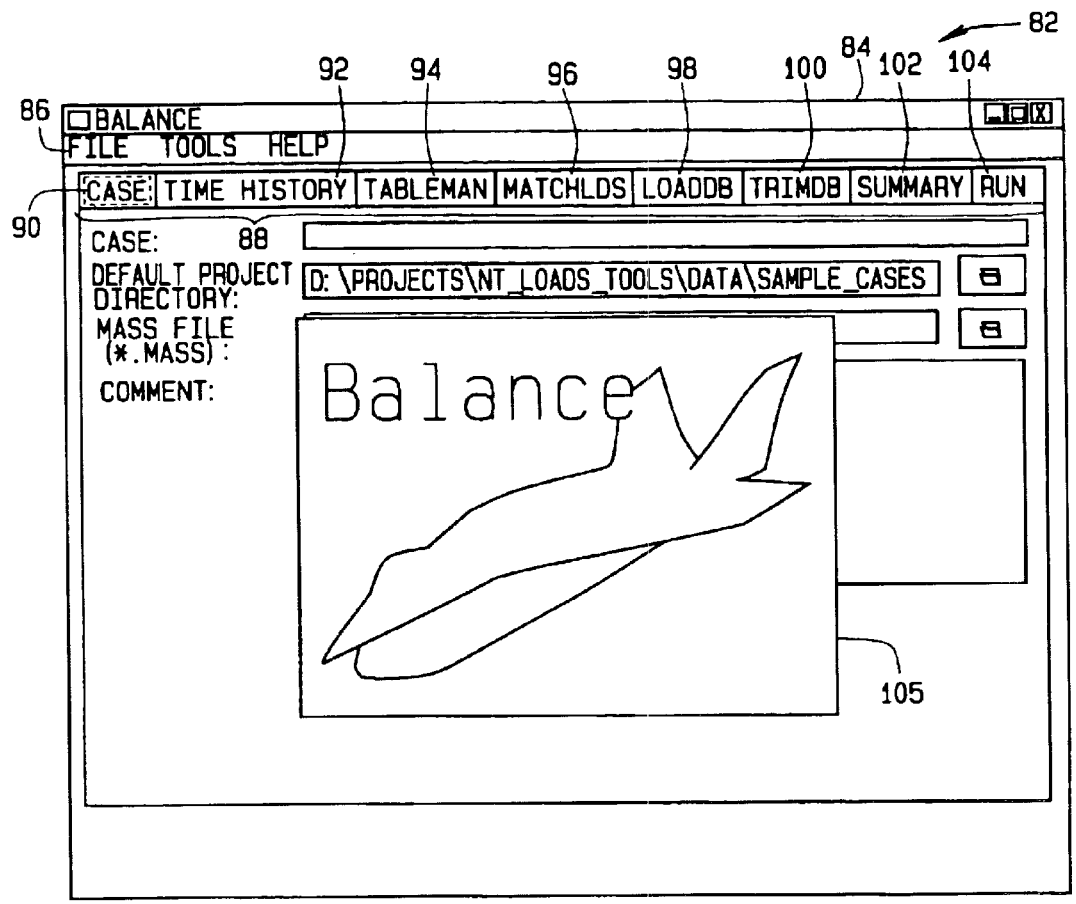
FIG. 3 is an illustration of an Introductory panel that may be displayed during execution of a resource integration program by the system shown in FIG. 1.

FIG. 3 is an illustration of an Introductory panel 82 that may be displayed via output component 20 (FIG. 1) by the resource integration program 18. The Introductory panel 82 may include a panel layout 84 that is used for each interactive screen comprising the interface.

As shown, the panel layout 84 includes a pull down menu bar 86 that includes a File, Tools, and Help menu. The Introductory panel 82 may also display a decorative image 105 for a period of time.

The panel layout 84 may also comprise a plurality of panel tabs 88 that allows the user to navigate through the various interactive screens of the interface. When a panel tab is activated by the user with the input device 21, the corresponding panel is displayed on the output component 20. In a preferred embodiment, the panel tabs 88 include a Case tab 90, a Time History tab 92, a Tableman tab 94, a MatchLds tab 96, a LoadDB tab 98, a TrimDB tab 100, a Summary tab 102, and a Run tab 104. It is envisioned, however, that the panel tabs 88 may also include other tabs associated with other panels of the interface. For example, the interface may include a Graphing tab such that upon activation thereof, the system 10 graphically displays at least one balanced flight loads data set. Or for example, the interface may include a Critical load point tab such that upon activation thereof, the system 10 analyzes the balanced flight loads data sets to locate at least one critical load point (e.g., time instance wherein a certain variable is a maximum or a minimum) and then outputs at least a portion of the data contained in the balanced flight loads data set for the critical load point.

As an alternative to the panel tabs 88, the integrating flight loads balanced software package 18 could proceed in a step-by-step fashion such that the user would be required to enter the requested data in an interactive screen before advancing on to another interactive screen. For example, upon execution of the resource integration program 18, the Case tab 90 may be the only panel tab 88 available to a user. The remaining panel tabs 92 through 104 may be disabled. Accordingly, the user would not be able to advance to a subsequent panel until all the data requested in the Case panel is entered. Once the user completes entering the data requested on the Case panel, the user may then activate or click a next button (not shown) and/or the next panel tab (e.g., Time History tab 92) to advance. Regardless of how the user navigates between the interactive screens, the Summary tab 102 and Run tab 104 may not be enabled until the panels associated with the panel tabs 90 through 100 have been completed.

Figure 4:
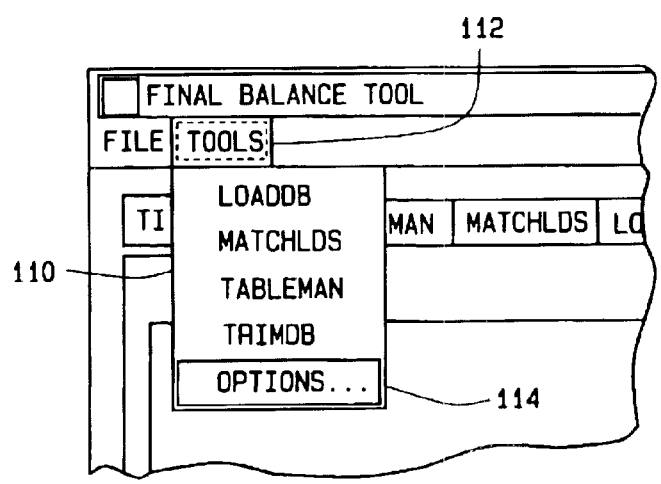
FIG. 4 is an illustration of a Tools menu that may be displayed after the Tools menu has been selected from the pull down menu bar during execution of the resource integration program.
Figure 5:
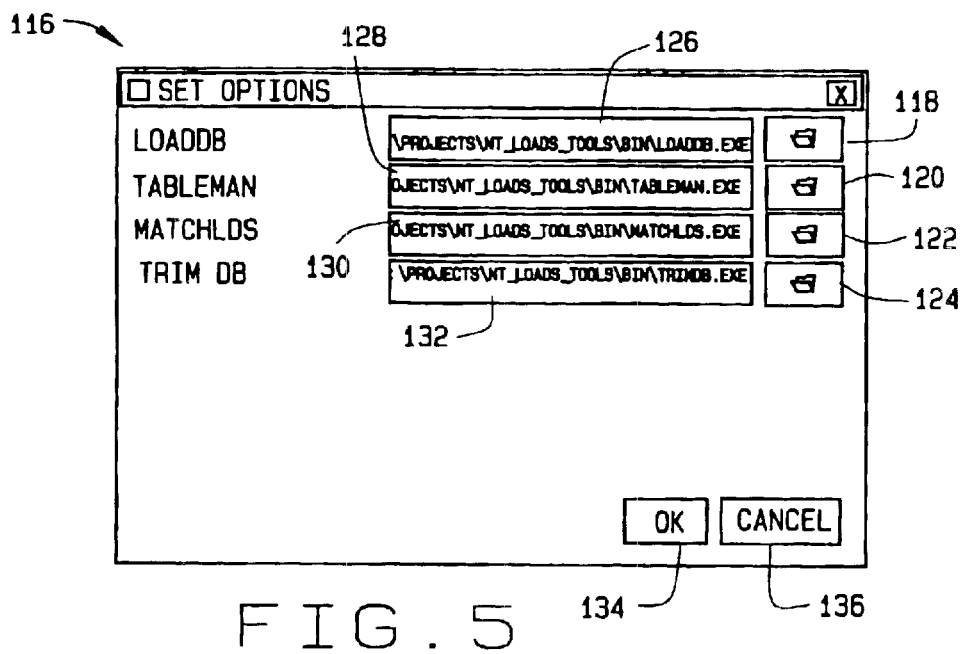
FIG. 5 is an illustration of a Set Options dialog box that may displayed after the Options menu command has been selected from the Tools menu shown in FIG. 4.

FIG. 4 is an illustration of a Tools menu 110 that may be displayed on display 20 after the Tools menu button 112 has been selected from the pull down menu bar 86 during execution of the resource integration program 18. Generally, the Tools Menu 110 allows the user to designate the software resources (e.g., MatchLds 42, Tableman 44, LoadDB 46, TrimDB 48) that will be integrated for use by the system 10 to balance flight loads.

Preferably, the Tools Menu 110 allows the user to choose to have the system 10 access (e.g., run, operate, retrieve data from, etc.) one of the resources listed in the Tools Menu 110, assuming that the resource is otherwise accessible to the system 10 (e.g., installed on the system 10, etc.). Accordingly, the Tools Menu 110 thus allows for verification that the resource listed in the Tools Menu 110 is accessible to the system 10.

The Tools Menu 110 also includes an Options menu command 114, which is shown highlighted in FIG. 4. After the Options menu command 114 is activated, the Set Options dialog box 116 shown in FIG. 5 may be displayed on display 20. Generally, the Set Options dialog box 116 allows the user to enter the path or file name for one or more of the resources listed in the Tools menu 110. As shown, the Set Options dialog box 116 allows the user to enter the paths or file names for the resources LoadDB 46, Tableman 44, MatchLds 42, and TrimDB 48 by using a corresponding browse button 118, 120, 122, and 124. Preferably, only files relating to the resource for which the browse button was activated are displayed to the user. For example, activating browse button 118 preferably displays and allows the user to select from LoadDB files.

The Set Options dialog box 116 may also allow the user to designate the resources LoadDB 46, Tableman 44, MatchLds 42, and TrimDB 48 by typing paths or files names into corresponding data entry fields 126, 128, 130, 132. The user may continue with the integrated flight loads balancing process by activating or clicking the OK button 134 or the Cancel button 136.

Figure 6:
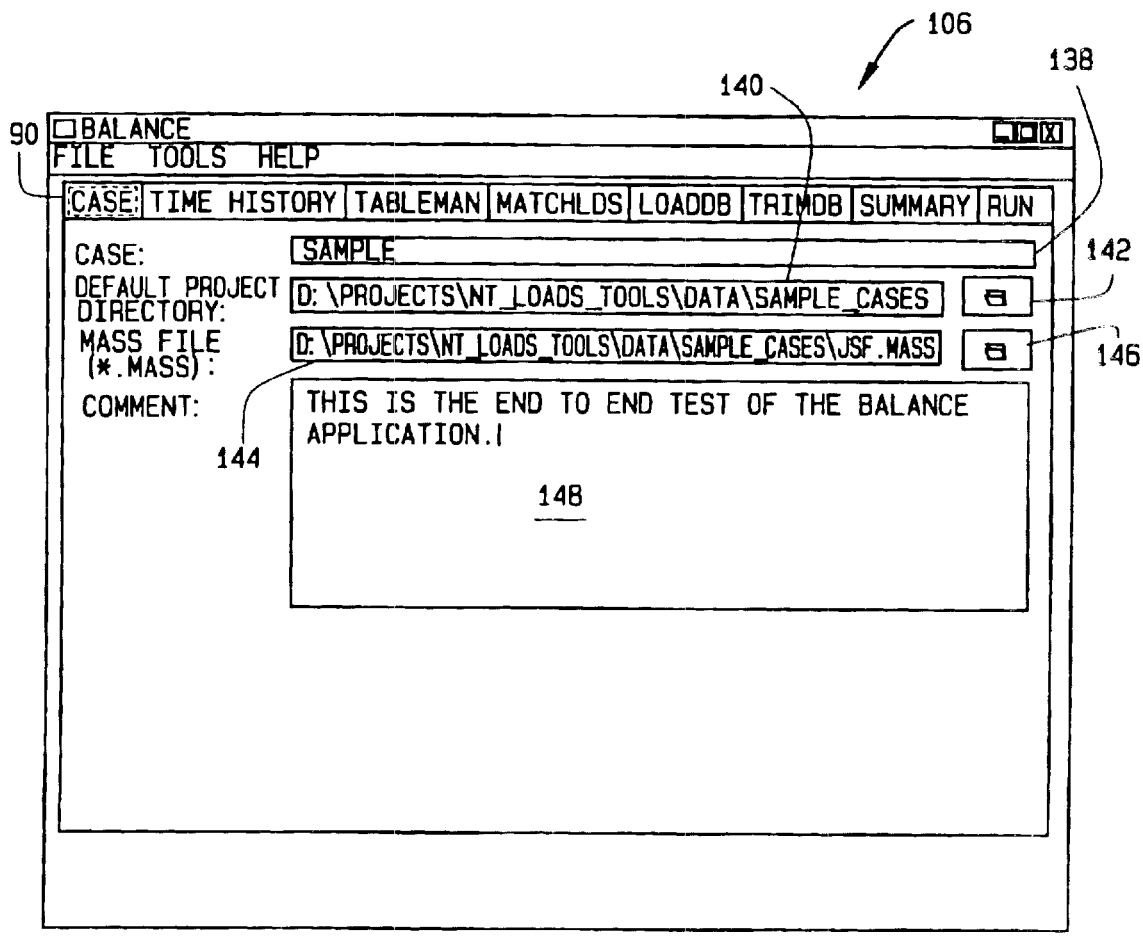
FIG. 6 is an illustration of a Case panel that may be displayed after the Case tab has been selected during execution of the resource integration program.

FIG. 6 is an illustration of the Case panel 106 that may be displayed on display 20 after the Case tab 90 has been selected during execution of the resource integration program 18. Generally, the Case panel 106 allows the user to enter a Case name for the project, designate a Default Project Directory for the input files and/or output files, designate a Mass Properties File, and enter comments about the project.

As shown, the Case panel 106 includes a data entry field 138 into which the user may enter a case name for the project. Preferably, the case name is appended to the output files generated during the integrated flight loads balancing process.

The Case panel 106 may further include a data entry field 140 and an accompanying browse button 142. The data entry field 140 and browse button 142 may be used by the user to designate the Default Project Directory for the input files and/or output files of the integrated flight loads balance process.

The Case panel 106 may also include a data entry field 144 and a corresponding browse button 146 that allow the user to designate a Mass Properties File (e.g., Mass Properties File 24). Preferably, activation of the browse button 146 displays and allows the user to select from only mass properties files. By way of example, the Mass Properties File designated by the user may comprise a space or comma delimited text file in which the following aircraft mass data is contained: an index; the weight; the xyz location of the center of gravity (i.e., the x, y, z coordinates of the aircraft center of gravity in a flight mechanics coordinate system with x forward, y right, and z down); the mass moments of inertia (i.e., Ixx, Iyy, Izz); and the products of inertia (i.e., Ixy, Iyz, Ixz).

The Case panel 106 preferably includes a text entry box 148 into which the user may enter comments about the project, if desired. By entering comments, the user may provide information relating to the project that is read by subsequent users. The comments contained in the text entry box 148 preferably do not affect the output of the integrated flight loads balancing process.

Figure 7:
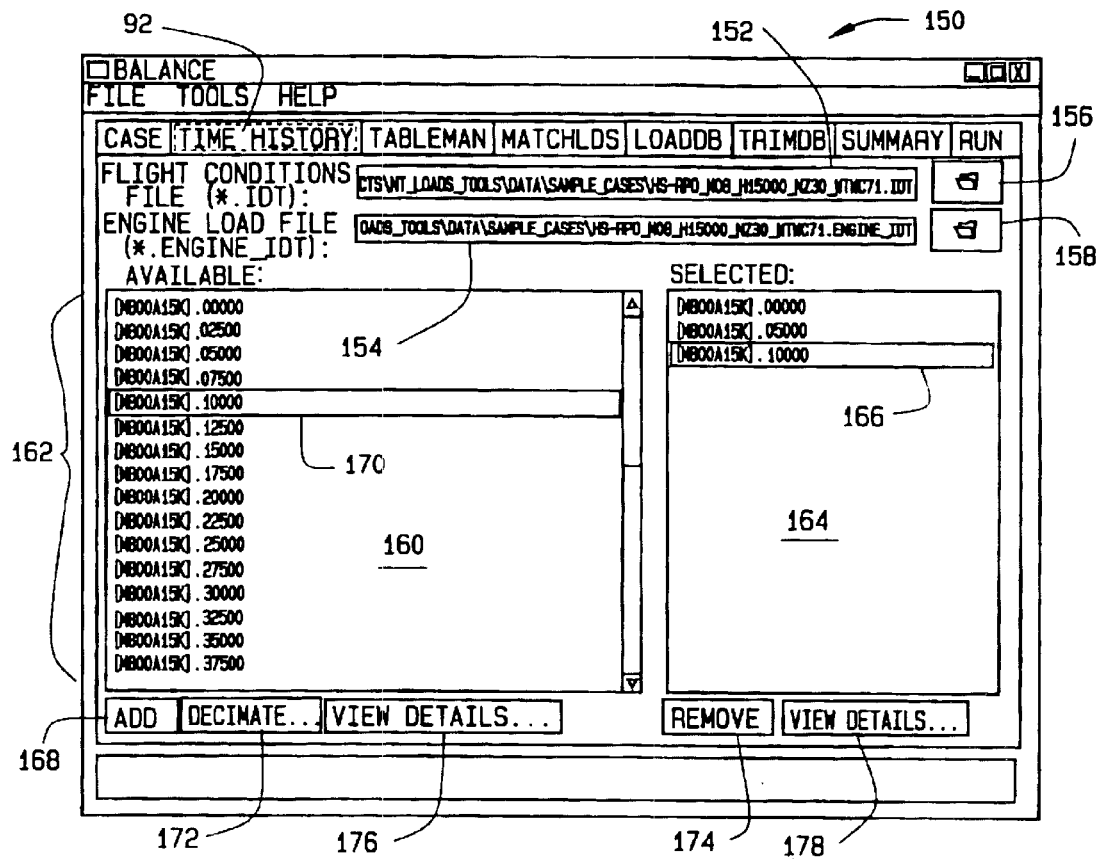
FIG. 7 is an illustration of a Time History panel that may be displayed after the Time History tab has been selected.

FIG. 7 is an illustration of a Time History panel 150 that may be displayed on display 20 after the Time History tab 92 has been selected during execution of the resource integration program 18 by the system 10. Generally, the Time History panel 150 allows the user to select one or more time history files, to designate one or more available time instances from the time history files, and to view details about the available time instances.

Preferably, the Time History panel 150 allows for the designation of a time history file from more than one discipline or design group. Typically, the data needed for a flight loads balancing process will be provided by more than one group. Accordingly, it may be more efficient to allow each group to provide their data in a separate time history file. In the illustrated embodiment, the Time History panel 150 allows the user to designate a flight conditions time history file and an engine loads time history file because the engine loads data and flight conditions data will likely be provided by different groups or teams (e.g., a propulsion team and a guidance and controls team).

Preferably, the system 10 will not load two or more time history files unless the time history files each contain the same or identical time instances. When a designated time history file contains flight maneuver time instances that do not correspond with another designated time history file, the system 10 may return an error message.

As shown, the Time History panel 150 includes data entry fields 152 and 154 and respective browse buttons 156 and 158 that respectively allow the user to designate a flight conditions time history file (e.g., Flight Conditions Time History File 26) and an engine loads time history file (e.g., Engine Loads Time History File 28). Preferably, activation of the browse button 156 allows the user to select from only flight conditions time history files, whereas activation of the browse button 158 allows the user to select from only engine loads time history files.

The Flight Conditions and Engine Loads Time History Files 26 and 28 may both comprise an IDEPT time history file, although other formats are also possible. To allow for easier identification of the time history files, each time history files may be provided with an ".idt" descriptive file extension.

Regardless of its format, the Flight Conditions Time History File 26 may contain a plurality of available flight maneuver time instances and certain data associated with each available time instance. For example, the Flight Conditions Time History File 26 may contain the following data for each available time instance: dynamic pressure; roll rate; pitch rate; yaw rate; roll acceleration; pitch acceleration; yaw acceleration; longitudinal acceleration at the aircraft center of gravity; lateral acceleration of the aircraft center of gravity; normal acceleration of the aircraft center of gravity; true airspeed; x y z velocities and x y z accelerations in a flight mechanics coordinate system (i.e., with x forward, y right and z down); pitch attitude; roll attitude; among others.

The Engine Loads Time History File 28 may also comprise the plurality of available flight maneuver time instances and the engine forces and moments for each available time instance. Preferably, the engine forces and moments are represented in a model coordinate system wherein x is aft, y is right, and z is up.

The Time History panel 150 may further include a window 160 for displaying each of the available flight maneuver time instances 162 contained in the flight conditions and engine loads time history files. Accordingly, the window 160 shows the available time instances 162 that a user may select for the integrated flight loads balancing process. The Time History panel 150 may also include another window 164 for displaying the time instances that have been selected from the window 160.

To make the selection from amongst the available time instance 162 in window 160, the Time History panel 150 may include an Add button 168. Activation of the Add button 168 adds a highlighted time instance 170 in the window 160 to the list of selected time instances 166 displayed in the window 164. A Decimate button 172 may be provided which upon activation automatically selects certain time instances from the available time instances 162 shown in window 160. For example, every fourth time instance may be automatically selected when the Decimate button 172 is activated. A Remove button 174 may also be provided which upon activation removes a highlighted time instance 166 from the list of selected time instances shown in window 164. Finally, the Time History panel may also include View Details buttons 176 and 178 for respectively viewing the details (e.g., simulation data, flight conditions, component loads, engine loads, etc.) associated with a highlighted time instance 170 in the window 160 or with a highlighted time instance 166 in the window 164, as shown in FIG. 8.

Additional features may also be provided by the Time History panel 150. For example, a Peak Valley Detection button may be provided that, when selected, allows the user to designate a certain variable and have only the time instance(s) selected where the peaks and valleys of the certain variable occur.

Figure 8:
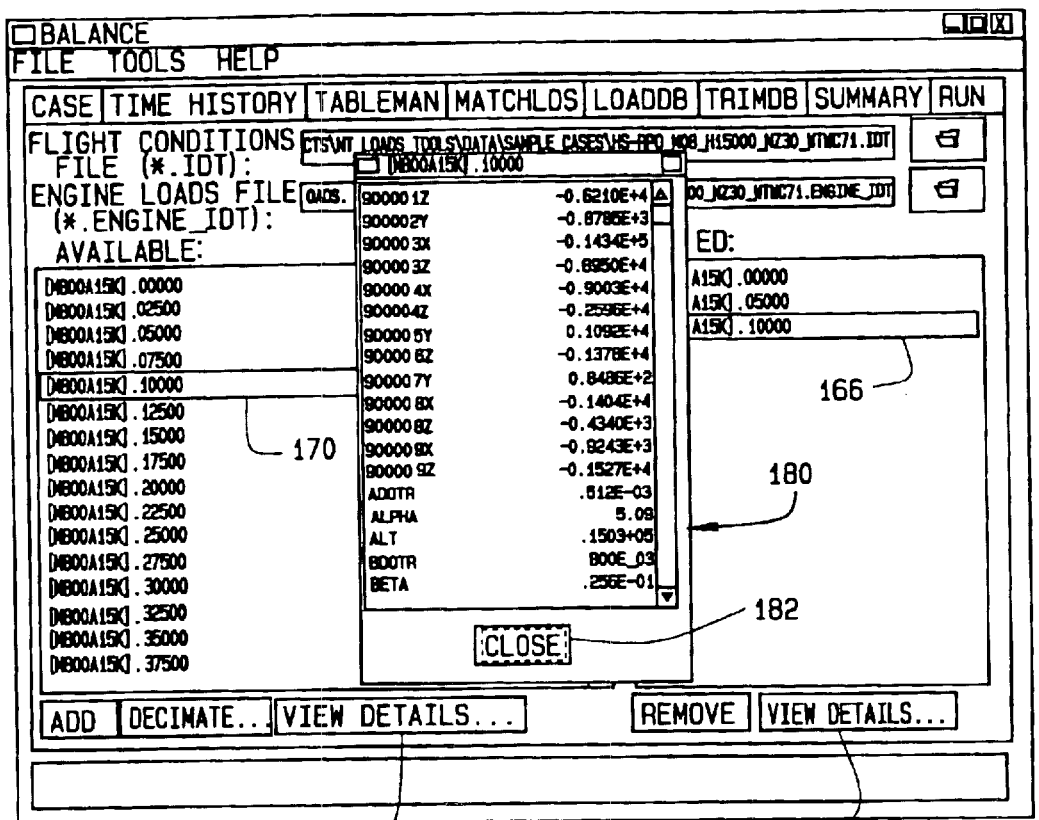
FIG. 8 is an illustration of a View Details dialog box that may be displayed after a View Details button of the Time History panel shown in FIG. 7 has been selected.

FIG. 8 is an illustration of a View Details dialog box 180 that may be displayed on display 20 after the View Details button 176 or 178 of the Time History panel 150 has been activated during execution of the resource integration program 18 by the system 10. Any one of a wide range of details may be provided for a highlighted time instance (e.g., 170 or 166) upon activation of either of the View Details buttons 176 or 178. A Close button 182 may be provided that when activated closes the View Details dialog box 180.

Figure 9:
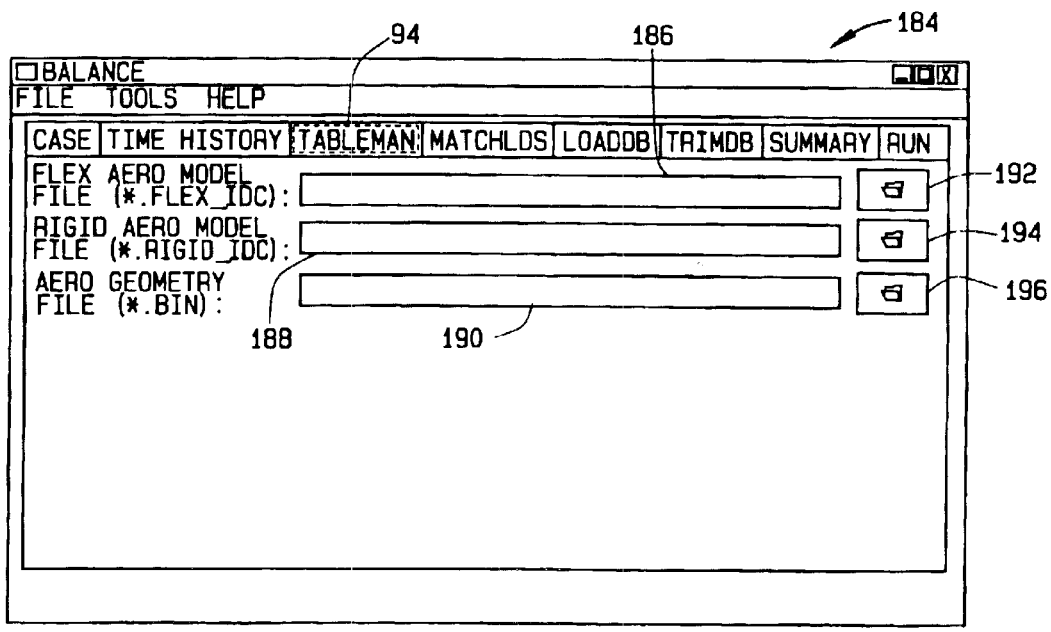
FIG. 9 is an illustration of a Tableman panel that may be displayed after the Tableman tab has been selected during execution of the resource integration program.

FIG. 9 is an illustration of a Tableman panel 184 that may be displayed on display 20 after the Tableman tab 94 has been selected during execution of the resource integration program 18 by the system 10. Generally, the Tableman panel 184 allows the user to designate certain resources (e.g., Flexible Aero Model File 30, Rigid Aero Model File 32, Aero Geometry File 34) that may be accessed by the system 10 when performing step 66 of method 60 (FIG. 2) (i.e., when creating an interpolated aero pressure distribution for the aircraft).

As shown, the Tableman panel 184 includes a plurality of data entry fields 186, 188, and 190 each of which has a corresponding browse button 192, 194, and 196 associated therewith. Accordingly, the data entry fields 186, 188, 190 and browse buttons 192, 194, 196 allow the user to designate a Flexible Aero Model File (e.g. Flexible Aero Model File 30), a Rigid Aero Model File (e.g., Rigid Aero Model File 32) and an Aero Geometry File (e.g., Aero Geometry File 34). Preferably, activation of one of the corresponding browse buttons 192, 194, 196 allows the user to select from only the files corresponding with the browse button selected. For example, activation of browse button 192 preferably allow the user to choose from amongst the flexible aero model files.

The Flexible Aero Model File may comprise data relating to the incremental loads due to static deformation of the aircraft's wings. The Rigid Aero Model File may comprise a rigid aerodynamic loads database created from the simulation data (FIG. 2) and computational fluid dynamics (CFD) data. The Aero Geometry File may comprise a three-dimensional model of the aircraft. Although other formats are possible, the Flexible and Rigid Aero Model data files may both comprises an IDEPT CTAB format file used by Tableman 44, whereas the Aero Geometry File may comprise a binary format. The IDEPT CTAB format files (e.g., the Flexible and Rigid Aero Models) may each be provided with an ".idc" descriptive file extension to allow for easier identification thereof. Similarly, the binary files (e.g., Aero Geometry File) may be provided with a ".bin" descriptive file extension to allow for easier identification thereof.

Figure 10:
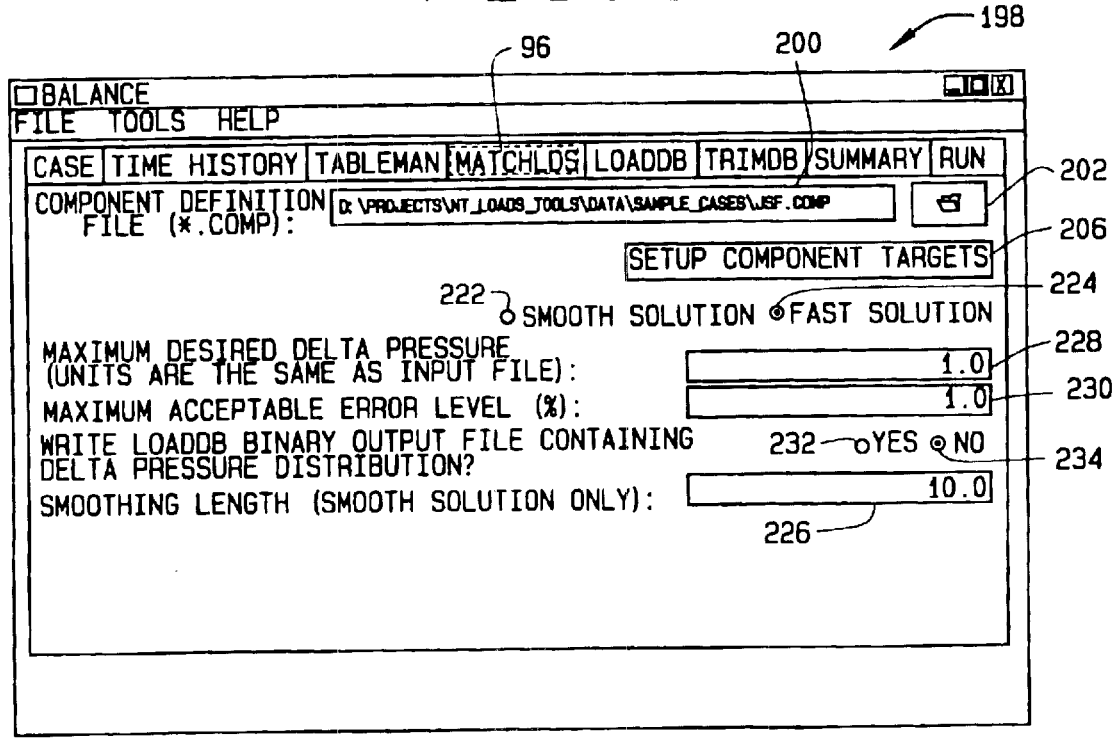
FIG. 10 is an illustration of a MatchLds panel that may be displayed after the MatchLds tab has been selected.

FIG. 10 is an illustration of a MatchLds panel 198 that may be displayed on display 20 after the MatchLds tab 96 has been selected during execution of the resource integration program 18 by the system 10. As shown, the MatchLds panel 198 includes a data entry field 200 and a browse button 202 that allow the user to select a Component Definition File (e.g., Component Definition File 36) that may be accessed by the system 10 when performing step 68 of method 60 (FIG. 2) (i.e., when redistributing the interpolated aero pressure distribution to create an aero grid). Preferably, activation of the browse button 202 displays allows the user to select from only component definition files.

The Component Definition File may define the entire aircraft and/or just portions of the aircraft. For example, the Component Definition File may define the wing or the portion of the fuselage aft of the wing. Preferably, however, the Component Definition File includes at least one component definition that defines the entire vehicle. To allow for easier identification of the component definition files, each component history file may be provided with a ".comp" descriptive file extension.

Figure 11:
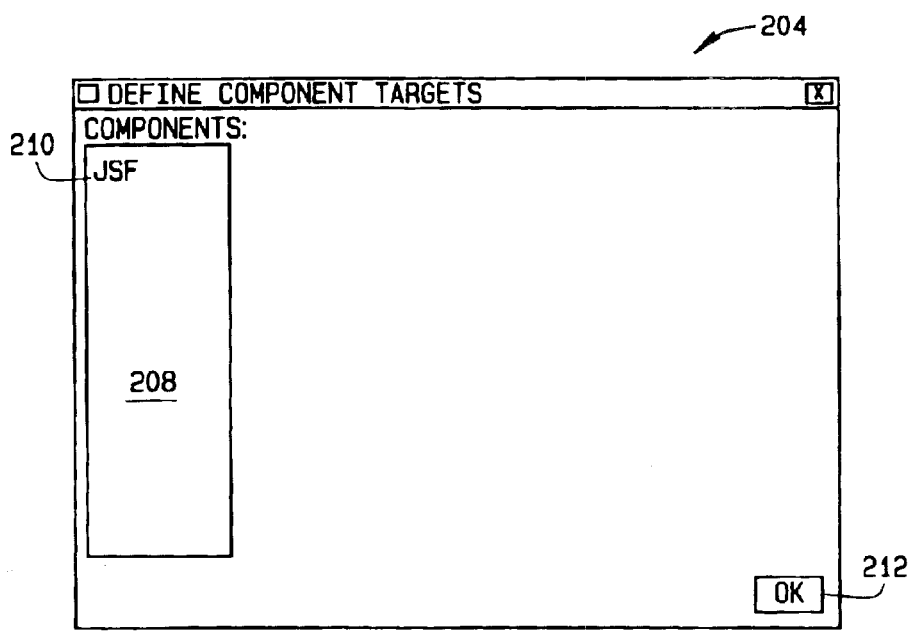
FIG. 11 is an illustration of a Define Component Targets dialog box that may be displayed after a Setup Component Targets button of the MatchLds panel shown in FIG. 10 has been selected.

FIG. 11 is an illustration of a Define Component Targets dialog box 204 that may be displayed on display 20 after a Setup Component Targets button 206 of the MatchLds panel 198 has been selected during execution of the resource integration program 18 by the system 10. The Define Component Targets dialog box 204 allows the user to select which components of the aircraft (e.g., wing root, entire aircraft, etc.) will undergo the integrated flight loads balance process. As shown, the user may select from one or more components (e.g., JSF) listed in a window 208 by highlighting the component 210 and then activating the OK button 212.

Figure 12:
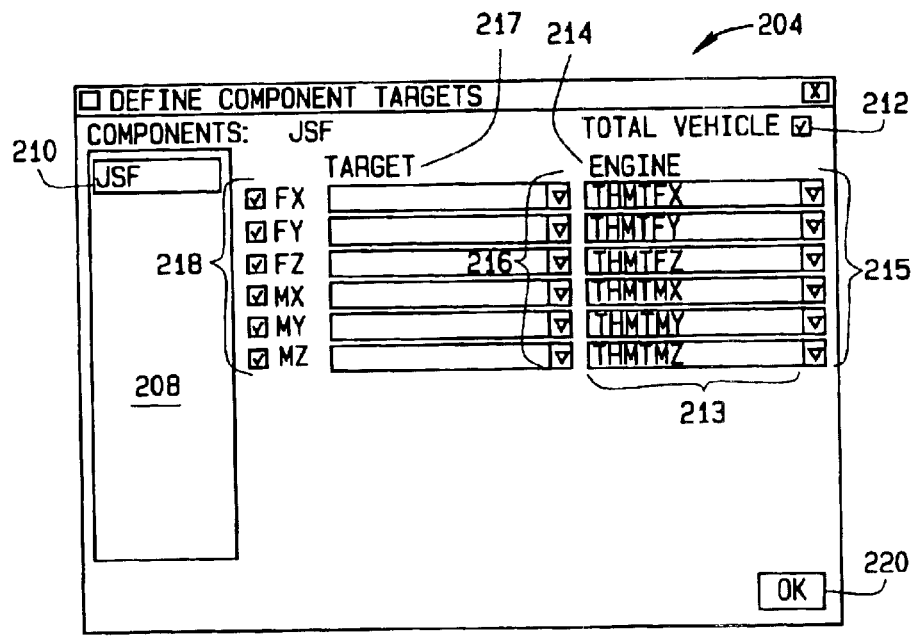
FIG. 12 is an illustration of the Define Component Targets dialog box shown in FIG. 11 after the component and the total vehicle box have been selected therefrom.

FIG. 12 is an illustration of the Define Component Targets dialog box 204 after the user has selected a component 210 from the window 208 and has checked a Total Vehicle Box 212 during execution of the resource integration program 18 by the system 10. Although only one component (i.e., JSF) is shown in the window 208, the window 208 typically will contain numerous components.

If the selected component 210 represents the entire aircraft, the user should ensure that the Total Vehicle Box 212 is checked. When the Total Vehicle Box 212 is checked for a given component 210 (e.g., JSF), the target forces and moments for the entire aircraft will be calculated during the integrated flight loads balancing process. The user may, however, need to select the variables that represent the engine forces and moments because the variables 213 (i.e., THMTFX, THMTFY, THMTFZ, THMTMX, THMTMY, THMTMZ) are automatically selected by default (i.e., without any user intervention) under the Engine heading 214. To override the default selection, the user may access the lists of available variables in either the Engine drop-down boxes 215 and/or the Target drop-down boxes 216 and then select the appropriate variables that should be used for the selected component's target force/moment value. For example, if the selected component 210 represents the wing, the user should select the target forces and moments under the Targets heading 217 that match or correspond with the wing. Preferably, the drop-down boxes 215 under the Engine heading 214 are disabled when the selected component 210 does not represent the total vehicle.

During the balancing process, the target forces are calculated as a combination of the engine forces and inertial forces. The inertial forces are calculated using the actual flight conditions in the flight conditions time history file and the mass properties in the mass properties file.

The Define Component Targets dialog box 204 may also include boxes 218 that when unchecked causes the corresponding force and/or moments (FX, FY, FZ, MX, MY, MZ) to be disregarded during the balancing process. The forces and moments (FX, FY, FZ, MX, MY, MZ) are preferably in an xyz coordinate system wherein x is aft, y is right, and z is up.

After finishing with the Define Components Target dialog box 204, the user may be returned to the MatchLds panel 204 by activating the OK button 220.

Referring back to the MatchLds panel 198 shown in FIG. 10, the user may choose either a fast or a smooth solution for the integrated flight loads balancing process by checking the appropriate circle 222 or 224. The smooth solution provides a more realistic distribution of the pressures than does the fast solution by using a more computationally intensive singular value decomposition algorithm. However, the smooth solution, being more computationally intensive, does require more processing time for completion of the integrated flight loads balancing process. Accordingly, the decision to use either a smooth or fast solution will likely depend at least in part on a balancing or tradeoff of processing time with accuracy. If the smoothing solution is selected, the user may also choose to override the default value for the Smoothing Length by entering an appropriate value into the data entry field 226.

In addition, the MatchLds panel 198 may also allow the user to override certain default parameters that are used when the interpolated aero pressure distribution is redistributed to create the aero grid (i.e., at step 68 of method 60, FIG. 2). For example, the user may change the default values for the Maximum desired delta pressure and/or Maximum acceptable error by way of the data entry fields 228 and 230. Preferably, the user is advised or notified if the Maximum desired delta pressure and/or the Maximum acceptable error is exceeded during the integrated flight loads balancing process.

The MatchLds panel 198 may also allow the user to choose whether the system 10 writes the delta pressure distribution to an output file (e.g., a binary file) by checking the appropriate circle 232 or 234.

Figure 13:
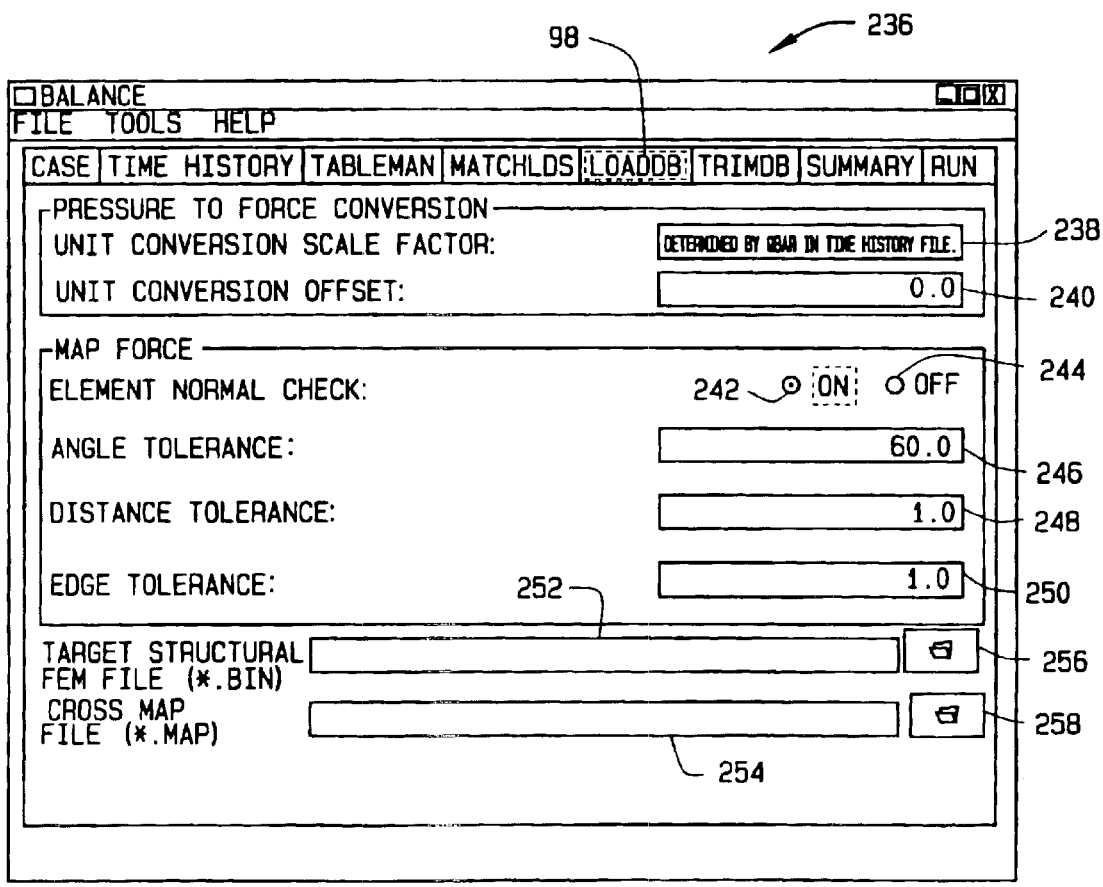
FIG. 13 is an illustration of a LoadDB panel that may be displayed after the LoadDB tab has been selected.

FIG. 13 is an illustration of a LoadDB panel 236 that may be displayed on display 20 after the LoadDB tab 98 has been selected during execution of the resource integration program 18 by the system 10. Generally, the LoadDB panel 236 allows the user to designate various input parameters and resources (e.g., Structural FEM File 38, Cross Map File 40) that may later be used by the system 10 when mapping the pressures from the aero grid to the structural FEM of the aircraft and/or when converting the pressures mapped to the Structural FEM to forces.

As shown, the upper portion of the LoadDB panel 236 displays the pressure to force conversion factors (e.g., Unit Conversion Scale Factor 238, Unit Conversion Offset 240). The pressure to force conversion factors may be determined at least in part by the time history files (e.g., Flight Conditions Time History File 26, Engine Loads Time History File 28) that were selected by the user via the Time History panel 150. For example, the Unit Conversion Scale Factor 238 is determined at least in part by the dynamic pressure in the time history files.

The LoadDB panel 236 may also allow the user to access or enter various Map Force input parameters and features. As shown, the user may enable or disable "Element normal check" by checking the appropriate circle 242 or 244. The user may also change one or more of the default tolerance values (i.e., Angle, Distance, and Edge Tolerances) by entering data into the corresponding data entry fields 246, 248, and 250.

The LoadDB panel 236 may also contain additional data entry fields 252 and 254 each of which has a corresponding browse button 256 and 258 associated therewith. Accordingly, the user may access the browse buttons 256 and 258 and/or the respective data entry fields 252 and 254 to designate a Target Structural FEM File (e.g., Structural FEM File 38) and a Cross Map File (e.g., Cross Map File 40). Preferably, activation of the browse button 256 or 258 displays and allows the user to select from only the files (i.e., structural FEM files or cross map file) corresponding to the selected browse button 256 or 258.

The Target Structural FEM File may comprise data pertaining to the structural FEM onto which the converted forces will be mapped. The Target Structural FEM File may comprise a binary format and be provided with a ".bin" descriptive file extension, although other formats are possible.

The Cross Map File may comprise data pertaining to the mapping relationship between the aero grid and the structural FEM grid. To allow for easier identification of the cross map files, each cross map files may be provided with a ".map" descriptive file extension.

Figure 14:
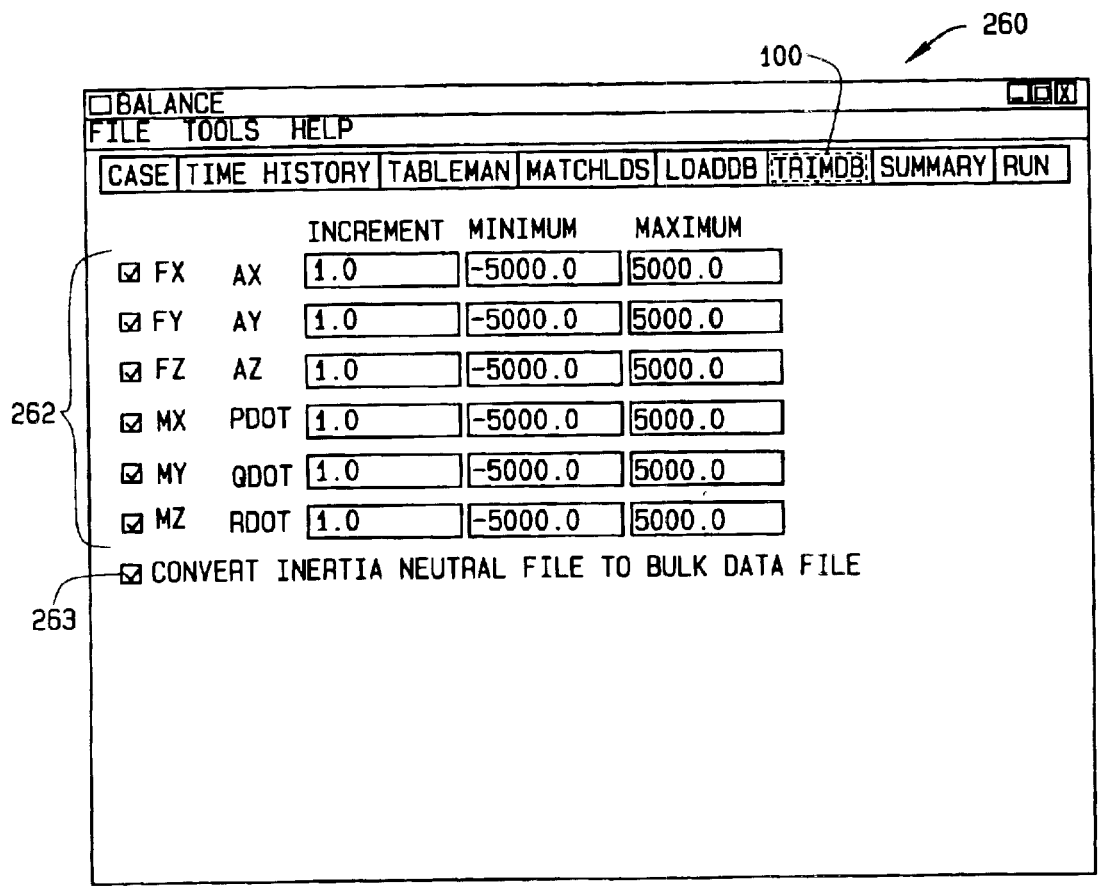
FIG. 14 is an illustration of a TrimDB panel that may be displayed after the TrimDB tab has been selected.

FIG. 14 is an illustration of a TrimDB panel 260 that may be displayed on display 20 after the TrimDB tab 100 has been selected during execution of the resource integration program 18 by the system 10. Generally, the TrimDB panel 260 allows the user to view and change, if necessary, certain default values that may later be used by the system 10 when balancing the flight loads and trimming the aircraft at step 78 of method 60 (FIG. 2). As shown, the TrimDB panel 260 allows the user to view and change default values pertaining to the Increment, Minimum, and Maximum values allowed for the forces and moments when the flight loads are being balanced and the aircraft is being trimmed. Even though the default values should be sufficient for most projects, greater flexibility is achieved by allowing the user to change the various tolerances.

The TrimDB panel 260 also allows the user to choose to which forces and moments (FX, FY, FZ, MX, MY, MZ) will be considered when the aircraft is being trimmed. As shown, the TrimDB panel 260 includes boxes 262 that when unchecked causes the corresponding force and/or moments (FX, FY, FZ, MX, MY, MZ) to be disregarded during the trimming process. The forces and moments (FX, FY, FZ, MX, MY, MZ) are preferably in an xyz coordinate system wherein x is aft, y is right, and z is up.

In addition, the TrimDB panel 260 also allows the user to choose whether the Inertia Neutral File will converted to a Bulk Data File by way of the box 263. By default, TrimDB 48 writes out the inertia data as a MSC.Patran Neutral File. MCS.Patran is a finite element modeler from MSC® Corporation of Santa Ana, Calif. Also by default, the system 10 converts the data within the MSC.Patran Neutral File to a NASTRAN format (which is also an MSC® tool) to be consistent with the rest of the output from the integrated flight loads balancing process. However, the user can choose to leave the output in the MSC.Patran format by unchecking the box 263.

FIG. 15 is an illustration of a Summary panel 264 that may be displayed on display 20 after the Summary tab 102 has been selected during execution of the resource integration program 18 by the system 10. Generally, the Summary panel 264 preferably allows the user to verify for accuracy and consistency at least a portion of the user inputs before the flight loads are balanced for the designated time instances. If the user discovers inaccuracies or inconsistencies, the user may then return to the appropriate panel and make the necessary changes before the system 10 actually begins balancing the flight loads and trimming the aircraft at the designated time instances. Accordingly, the user may save time and computer processing resources that would have otherwise been lost by performing the flight loads balancing process only to later discover that one or more of the user inputs was inaccurate or inconsistent.

For example, the Summary panel 264 may display for comparison the weight and center of gravity from the Mass Properties File 24 previously designated by the user via the Case panel 106 (FIG. 6) and from the time history file(s) previously designated by the user via the Time History panel 150 (FIG. 7). If the weights and centers of gravity are not substantially equal, the user may be required to change one or more of the user inputs. A wide range of other information relating to the aircraft and the time instances may also or alternately be displayed for comparison via the Summary panel 264. For example, the Summary panel 264 may display the file names of the data resources, the paths entered for software resources, the designated time slices, etc.

Figure 16:
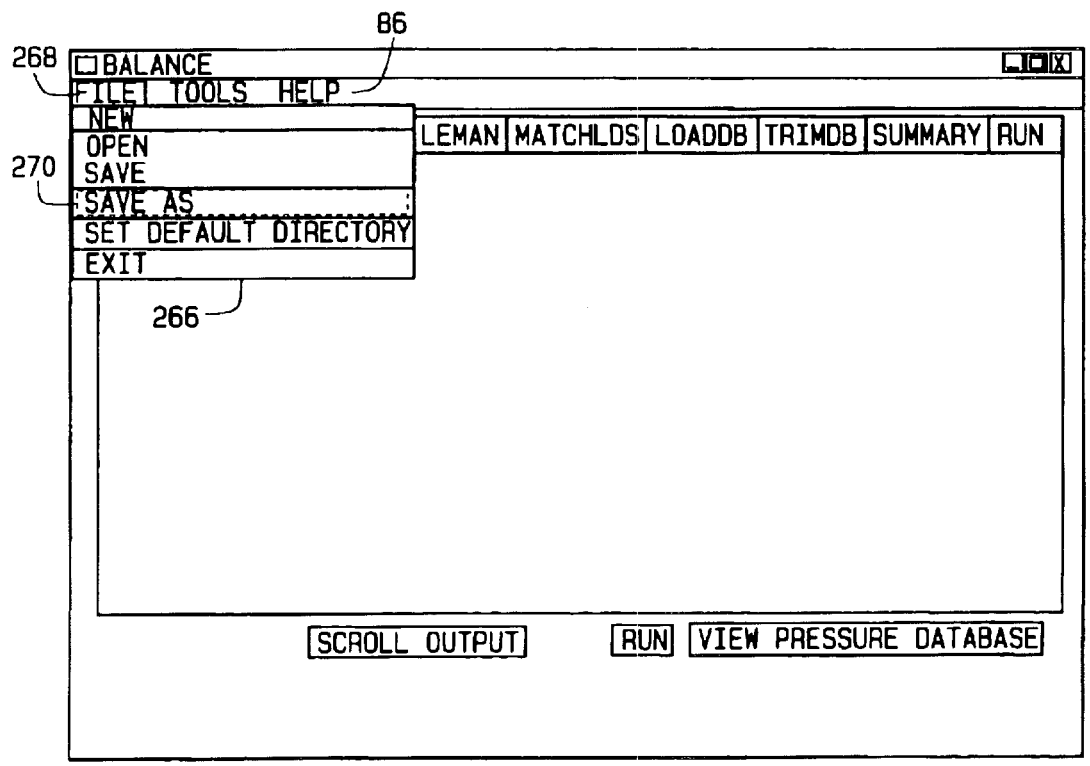
FIG. 16 is an illustration of a File menu that may be displayed after the File menu has been selected from the pull down menu bar.

FIG. 16 is an illustration of a File menu 266 that may be displayed on display 20 after the File menu button 268 has been activated from the pull down menu bar 86 during execution of the resource integration program 18 by the system 10. The File menu 266 may allow the user to choose from among a variety of menu commands (e.g., New, Open . . . , Save, Save As . . . , Set Default Directory . . . , Exit). For example, the user may click on the Save As menu command 270 to save the project thereby allowing the project to be opened later for editing or use as a template.

Preferably, saved projects may also be processed later either in a graphical application or as a batch process.

Figure 17:
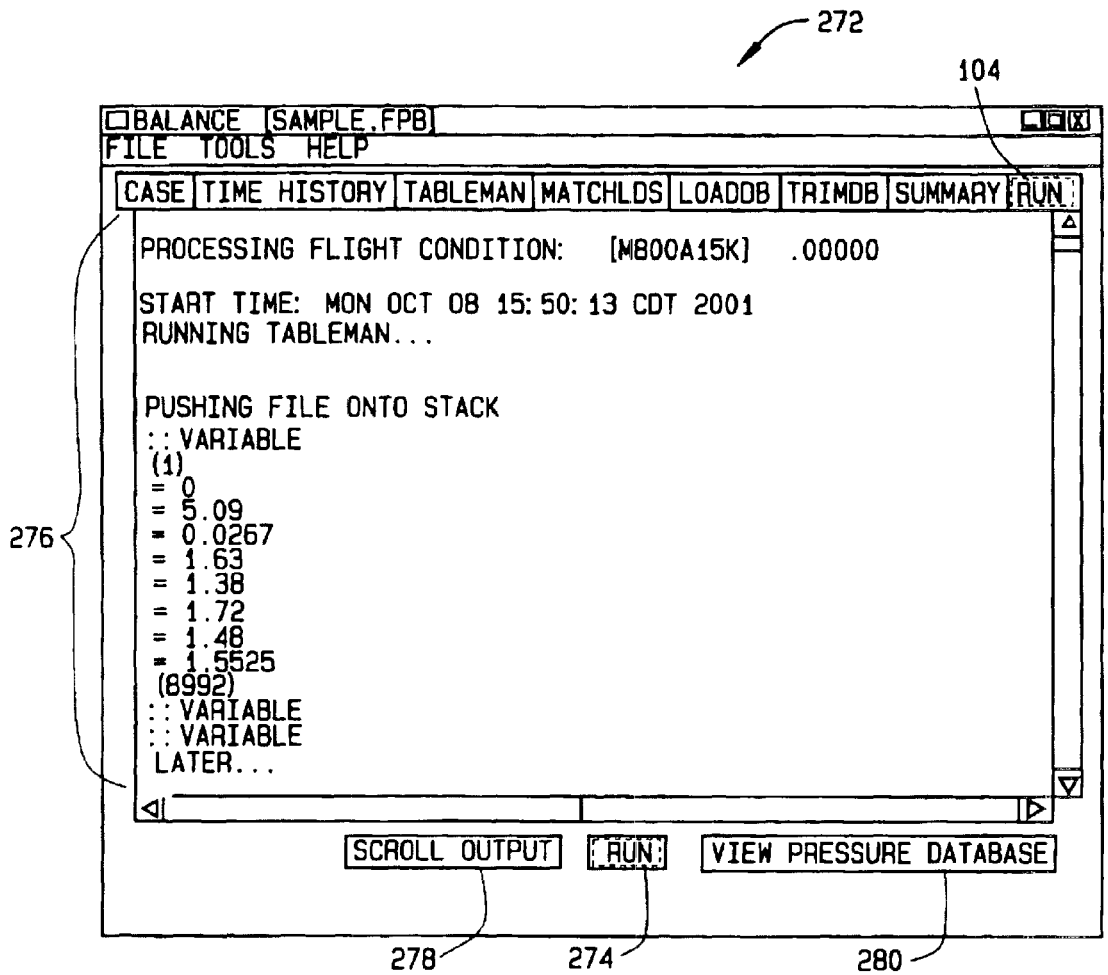
FIG. 17 is an illustration of a Run panel that may be displayed after the Run tab has been selected.

FIG. 17 is an illustration of a Run panel 272 that may be displayed on display 20 after the Run tab 104 has been selected during execution of the resource integration program 18 by the system 10. As shown, the Run panel 272 allows the user to initiate the process (e.g., batch process, graphical application, etc.) of balancing the flight loads and trimming the aircraft at the designated time instances by activating a Run button 274.

Preferably, the results (e.g., the balance flight loads data sets for the designated time instances) are automatically saved to one or more output files (e.g., log file, database, bulk data file, among others). For example, the adjusted rigid body states may be saved in a time history file, the balanced aero loads and balanced pressures may be saved in a database, the distributed aero loads on the structural FEM may be saved in a bulk data file, the distributed engine loads on the structural FEM may be saved in a bulk data file, and the distributed inertial loads on the structural FEM may be saved in a bulk data file.

Preferably, the Run panel 272 also includes a window 275 for displaying a text log of diagnostic output 276. The text log of diagnostic output 276 may comprise important or critical data from each of the software resources, stand-alone programs or applications (e.g., MatchLds 42, Tableman 44, LoadDB 46, and TrimDB 48) that are being integrated for use by the system 10 to balance the flight loads. To allow for easy viewing of the diagnostic output 276, the Run panel 272 may also include a Scroll Output button 278 that when activated allows the user to scroll through the diagnostic output 276. Moreover, the Run panel 272 may also include a button 280 that when activated allows the user to view a Pressure Database, which may contain the balanced pressure distributions for each of the designated time instances. For example, the button 280 may launch LoadDB 46 in conjunction with the file containing the balanced pressure distributions for each of the designated time instances. Within LoadDB 46, the user may then be able to select the time slices or instances for which the user wants to view the balanced pressure distribution. LoadDB 46 may display the pressure distributions in a three dimensional color-coded graphical representation of the aircraft wherein different colors are used to represent the different pressures on the aircraft.

Various other diagnostics and analysis tools may also or alternately be enabled or selected by way of the Run panel 272. Indeed, any one of a wide range of other diagnostic and analysis tools may be accessed by the Run panel 272 as would be obvious to persons having ordinary skill in the art after having become familiar with the teachings of the present invention. For example, the Run panel 272 may further include a button that when activated causes the system 10 to locate and display the critical load points of the flight maneuver. Or for example, the Run panel 272 may include a button that when activated causes the system 10 to ascertain whether any errors fell outside of tolerances ranges and, if so, return a message informing the user accordingly. As another example, the Run panel 272 may comprise a button that when activated causes the system 10 to produce a graphical representation of at least a portion of the balanced flight loads data sets (e.g., in a chart, in a two-dimensional line graph such as the engine forces versus time, engine moments versus time, angle of attack versus time, side slip angle versus time, load factor versus time, a three-dimensional color-coded graphical representation, etc.) The Run panel 272 may also allow the user to designate one or more of the time instances and have only the balanced flight loads data sets displayed for the designated time instances.

In still yet another form, the present invention provides a method for balancing flight loads at a plurality of critical load points of a flight maneuver utilizing the system 10. In one embodiment, the method comprises the steps of: executing the resource integration program 18 utilizing the processor 16; inputting data into a plurality of interactive screens (e.g., panels and dialog boxes shown in FIGS. 3 through 17) generated by the resource integration program 18 and displayed on the display 20, wherein inputting data comprises designating every available flight maneuver time instance; using the system 10 to balance the flight loads at the designated time instances; and analyzing the balanced flight loads to determine the critical load points of the flight maneuver.

By integrating or wrapping code around resources that are otherwise usable in a piecemeal fashion to balance aircraft flight loads at a single flight maneuver time instance, embodiments of the present invention provides a process for deriving the balanced cases that is more efficient, more automated, and more simplified than the balancing processes presently recognized in the art. Embodiments of the present invention allow for an integrated flight loads balancing process to be performed at a plurality of available flight maneuver time instances, or at every available flight maneuver time instance as the case may be, with little to no further user intervention being required after the system has begun balancing flight loads for at least one time instance. For example, in one embodiment, the system balances the flight loads at each of the designated time instances after the user has activated the Run button 274 (FIG. 17) without any further user invention being required.

Balancing flight loads often involves the use of large finite element models and numerous time instances such that efficiency is imperative. By providing a more efficient process for balancing flight loads than known processes, embodiments of the present invention allow for faster cycle times in defining loads design condition definitions, which in turn facilitates early design and procurement of parts from subcontractors.

In addition, known flight loads balancing processes require the user to enter data and initiate the balancing process for each and every flight maneuver time instance. Embodiments of the present invention, however, allow for the balancing of flight loads at a plurality of flight maneuver time instances without requiring further user intervention after the user has initiated the balancing process, for example, by activating the Run button 274 (FIG. 17). Accordingly, a more extensive survey of flight design conditions may be performed in less time with embodiments of the present invention than that which is possible with known processes recognized in the art because the process of deriving the balanced cases is more efficient and more automated than the balancing processes recognized in the art. Indeed, given the ease with which the flight loads at all available flight maneuver time instances may be balanced with embodiments of the present invention, the astute user may readily obtain a complete set of balanced loads.

Embodiments of the present invention also reduce the likelihood that a critical load point of a maneuver will be bypassed. With the embodiments of the present invention, the user can simply choose to have the flight loads balanced at each available flight maneuver time instance. Afterwards, the user can then analyze the balanced flight loads data to determine the critical load points of the flight maneuver. For example, the balanced flight loads data may be displayed in a graph which may then be analyzed by the user to discern critical loads points. Moreover, the time savings afforded by using an embodiment of the present invention allows the user to expend more time analyzing and evaluating the balanced flight loads data.

Another advantage of embodiments of the present invention is that they allow the loads engineer to readily obtain a complete set of balanced loads that may ultimately be passed to a fatigue group for analysis. Unlike loads and strength groups which are typically interested in only the absolute maximum and minimum load points of the maneuver, the fatigue group is usually interested in all of the peak and valley points of the maneuver. Ideally, several hundred or even a few thousand balanced load cases are required for fatigue analysis. Prior to the various embodiments of the present invention, however, a fatigue engineer could only work with component loads, such as the wing-root bending load. With embodiments of the present invention, the fatigue engineers may be provided with a fully balanced FEM and thus be able to analyze loads on a given spar, for example, if desired.

Yet another advantage of embodiments of the present invention is that they can expedite the development of flight design loads in that the embodiments of the present invention integrate resources into a robust framework that can be tailored to any candidate aircraft.

The description of the invention is merely exemplary in nature and, thus, variations that do not depart from the substance of the invention are intended to be within the scope of the invention. Such variations are not to be regarded as a departure from the spirit and scope of the invention While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A resource integration program emdodied in a computer readable media comprising:
    a plurality of inputs for enabling flight load information to be received by the program; and
    a module for integrating a plurality of flight load related resources, in connection with the inputs, to generate useful information for balancing flight loads at at least one specific time during a flight of a mobile platform;
    wherein the program, when generating the useful information accesses at least one or more of:
        simulation data;
        computational fluid dynamics data;
        wind tunnel test data; or
        a combination thereof.

2. The program of claim 1, wherein the program operates to generate useful information for balancing flight loads at at least one other specific time during the flight of the mobile platform without further user intervention being required.

3. The program of claim 1, wherein the program includes a module for using at least one user input to enable a user to input information for use in generating said useful information for balancing said flight loads.

4. The program of claim 3, wherein the at least one user input comprises a designation of at least one of the plurality of flight load related resources.

5. The program of claim 3, wherein the at least one user input comprises a designation of the at least one specific time.

6. The program of claim 3, wherein the module for using at least one user input generates at least one interactive screen.

7. The program of claim 1, wherein the plurality of flight load related resources comprises a plurality of information streams.

8. A resource integration program emdodied in a computer readable media comprising:
    a plurality of inputs for enabling flight load information to be received by the program;
    a module for integrating a plurality of flight load related resources, in connection with the inputs, to generate useful information for balancing flight loads at at least one specific time during a flight of a mobile platform; and
    wherein the program accesses simulation data and computational fluid dynamics data when generating the useful information.

9. A system comprising:
    a processor;
    a plurality of flight load related resources;
    a plurality of inputs for enabling flight load information to be received by the processor; and
    a resource integration program executable by the processor for integrating the plurality of flight load related resources, in connection with the inputs, to generate useful information for balancing flight loads at at least one specific time during a flight of a mobile platforms;
    wherein the system, when generating the useful information, accesses at least one or more of:
        simulation data;
        computational fluid dynamics data;
        wind tunnel test data; or
        a combination thereof.

10. The system of claim 9, wherein the program operates to generate useful information for balancing flight loads at at least one other specific time during the flight of the mobile platform without further user intervention being required.

11. The system of claim 9, further comprising a module for using at least one user input to enable a user to input information for use in generating said useful information for balancing said flight loads.

12. The system of claim 11, wherein the at least one user input comprises a designation of at least one of the plurality of flight load related resources.

13. The system of claim 11, wherein the at least one user input comprises a designation of the at least one specific time.

14. The system of claim 9, wherein the module for using at least one user input generates at least one interactive screen.

15. The system of claim 9, wherein the plurality of flight load related resources comprises a plurality of information streams.

16. A system comprising:
    a processor;
    a plurality of flight load related resources;
    a plurality of inputs for enabling flight load information to be received by the processor; and
    a resource integration program executable by the processor for integrating the plurality of flight load related resources, in connection with the inputs, to generate useful information for balancing flight loads at at least one specific time during a flight of a mobile platform;

wherein the system accesses simulation data and computational fluid dynamics data when generating the useful information.

17. An interface comprising:

means for enabling at least one input for enabling flight load information to be received by the interface; and means for integrating a plurality of flight load related resources, in connection with the input, to generate useful information for balancing flight loads at at least one specific time during a flight of a mobile platform;

wherein the interface, when generating the useful information, accesses at least one or more of:
simulation data;
computational fluid dynamics data;
wind tunnel test data; or
a combination thereof.

18. The interface of claim 17, further comprising means for generating useful information for balancing flight loads at at least one other specific time during the flight of the mobile platform without further user intervention being required.

19. The interface of claim 17, further comprising means for using at least one user input to enable a user to input information for use in generating said useful information for balancing said flight loads.

20. The interface of claim 19, wherein the at least one user input comprises a designation of at least one of the plurality of flight load related resources.

21. The interface of claim 19, wherein the at least one user input comprises a designation of at least one specific time.

22. The interface of claim 19, wherein the means for using at least one user input comprises means for generating at least one interactive screen.

23. The interface of claim 17, wherein the plurality of flight load related resources comprises a plurality of information streams.

24. A method comprising:

integrating a plurality of flight load related resources;

said flight load related resources using flight load information to generate useful information for balancing flight loads at at least one specific time during a flight of a mobile platform; and accessing at least one or more of simulation data, computational fluid dynamics data, wind tunnel test data, or a combination thereof, to generate the useful information.

25. The method of claim 24, further comprising using said flight load related resources to generate the useful information.

26. A method comprising:

integrating a plurality of flight load related resources;

said flight load related resources capable of using flight load information to generate useful information for balancing flight loads at at least one specific time during a flight of a mobile platform; and accessing simulation data and computational fluid dynamics data to generate the useful information.

27. The method of claim 24, wherein the method comprises using at least one user input to enable a user to input information for use in balancing said flight loads.

28. The method of claim 27, wherein the information input by the user comprises designation of at least one of the plurality of flight load related resources.

29. The method of claim 27, wherein the information input by the user comprises designation of the at least one specific time.

30. The method of claim 24, further comprising enabling the balancing of flight loads at at least one other specific time during the flight of the mobile platform without further user intervention being required.

31. The method of claim 24, further comprising analyzing balanced flight loads to determine at least one critical load point during the flight of the mobile platform.

32. The method of claim 24, wherein the plurality of flight load related resources comprises a plurality of information streams.

33. The program of claim 1, wherein the simulation data comprises computerized flight simulation data.

34. The program of claim 1, wherein the program accesses actual flight conditions at the at least one specific time when generating the useful information.

35. The system of claim 9, wherein the plurality of flight load related resources comprises at least one or more of a data resource, a software resource, and a data resource created by a software resource.

36. The system of claim 9, wherein the simulation data comprises computerized flight simulation data.

37. The system of claim 9, wherein the system accesses actual flight conditions at the at least one specific time when generating the useful information.

38. The interface of claim 17, wherein the simulation data comprises computerized flight simulation data.

39. The interface of claim 17, wherein the interface accesses actual flight conditions loads at the at least one specific time when generating the useful information.

40. The method of claim 24, wherein the simulation data comprises computerized flight simulation data.

41. The method of claim 24, further comprising accessing actual flight conditions at the at least one specific time when generating the useful information.

42. The method of claim 24, further comprising:

using the computational fluid dynamics data to create a pressure distribution across a computerized model of the mobile platform;

adjusting the pressure distribution to more closely correspond with the wind tunnel test data;

converting pressures from the adjusted pressure distribution to forces;

mapping the forces to a structural finite element model of the mobile platform;

accessing mass data and engine loads data; and balancing the forces, engine loads data, and mass data to balance the flight loads and trim the mobile platform at the at least one specific time.

* * * * *